W. B. BRONANDER

FIRE EXTINGUISHER

Jan. 12, 1932.

Original Filed March 7, 1928

Re. 18,327

INVENTOR

Wilhelm B. Bronander

BY

Marshall & Hawley.

ATTORNEYS

Reissued Jan. 12, 1932

Re. 18,327

UNITED STATES PATENT OFFICE

WILHELM B. BRONANDER, OF MONTCLAIR, NEW JERSEY

FIRE EXTINGUISHER

Original No. 1,808,154, dated June 2, 1931, Serial No. 259,762, filed March 7, 1928. Application for reissue filed July 27, 1931. Serial No. 553,458.

This invention relates to fire extinguishers.

More particularly stated, the invention relates to supports for the grenade type of fire extinguisher.

This invention has for its salient object to provide a support for a grenade so constructed that the grenade can be easily and readily removed therefrom and, furthermore, so constructed and arranged that in case of fire the grenade will automatically drop, break and dispense the fire extinguishing fluid.

Another object of the invention is to provide a bracket or holder for grenades comprising few parts and a structure that can be economically manufactured.

Another object of the invention is to provide a grenade support utilizing thermostatic metal in such a manner that the grenade will be automatically released in case of fire.

Further objects of the invention will appear from the following specification, taken in connection with the drawings, which form a part of this application, and in which Fig. 1 is a sectional elevation of a thermostatic strip;

Figure 4:
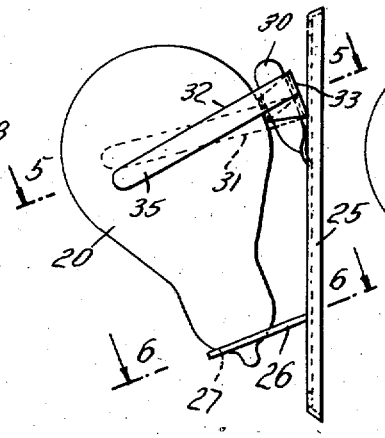
Fig. 4 is an elevational view illustrating another embodiment of the invention.
Figure 7:
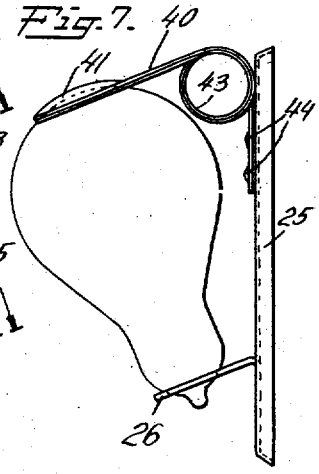
Figure 5:
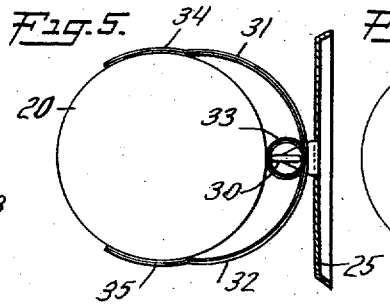
Figure 8:
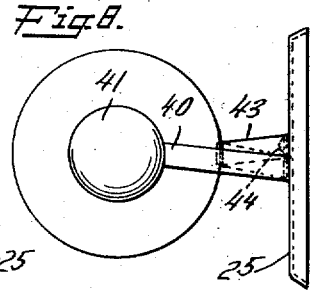
Figure 6:
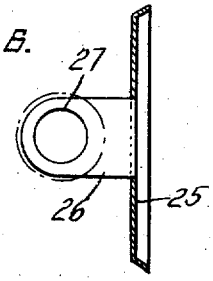

Figs. 5 and 6 are sectional elevations taken substantially on lines 5—5 and 6—6 of Fig. 4;

Fig. 7 is an elevational view illustrating another embodiment of the invention; and Fig. 8 is a top plan view of the construction shown in Fig. 7.

The invention briefly described consists of a grenade support comprising a supporting member or bracket and means carried by the supporting member and including a strip of thermostatic metal for engaging and holding a grenade. The strip of thermostatic metal is so constructed and arranged that in case of fire it will bend or be distorted under the action of heat and release the grenade from the holding means.

Further details of the invention will appear from the following description.

Figure 1:
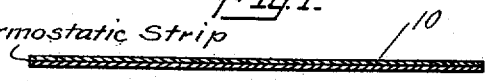

In Fig. 1 of the drawings there is shown a bimetallic strip 10 of thermostatic metal formed of two metallic strips joined together and having different coefficients of expansion. The strips are so arranged that under the action of heat the bimetallic strip is bent or changes its configuration.

The terms "thermostatic strip", "strip of thermostatic metal" and "thermostatic metal" as used in the specification and claims are intended to designate or define strips formed by joining together two metallic strips having different coefficients of expansion and so arranged that the composite strip will bend or change its configuration under the action of heat. Such thermostatic metal is common in the arts and is used for various purposes, such as thermometers, thermostatic switches, etc.

Figure 2:
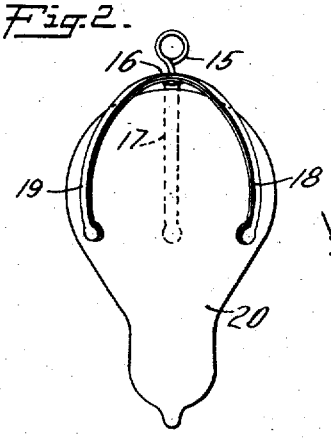
Fig. 2 is an elevational view showing one form of grenade support embodying the invention.
Figure 3:
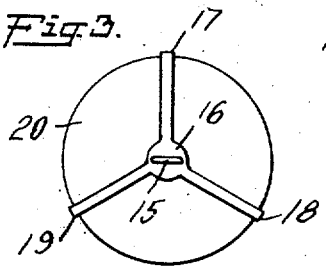
Fig. 3 is a top plan view of the structure shown in Fig. 2.

In Figs. 2 and 3 of the invention there is shown a supporting member in the form of an eye 15 to which is secured a disk 16 having radially disposed arms 17, 18 and 19 formed thereon or secured thereto. One or more of the arms is formed of thermostatic metal and the arms are normally bowed, as shown in Fig. 2, in such a manner as to embrace a grenade 20. The arms are resilient and of sufficient strength to grasp and retain a grenade therein when the grenade is pushed into or within the arms, as shown in Fig. 2.

It will be obvious that in case of fire the thermostatic metal will, under the action of heat, swing outwardly from the grenade, thus releasing the grenade which will fall and break, freeing the fire extinguishing fluid contained in the grenade.

In the form of the invention illustrated in Figs. 4, 5 and 6 there is shown a bracket or back plate 25 having a shelf 26 extending laterally therefrom and provided with an opening 27 for receiving the lower end of the grenade 20.

The bracket 25 also has struck out from the material thereof and extending upwardly and laterally therefrom a lug 30. The grenade is held on the shelf 26 by a resilient yoke comprising arms 31 and 32 connected by an integral loop 33, the loop being mounted on the lug 30. The outer ends of the arms 31 and 32 are curved as shown at 34 and 35 to fit the curvature of the grenade.

The yoke is preferably formed of thermostatic metal although it will be obvious that the device would operate if only one of the arms were formed of thermostatic metal. However, by forming both arms and the loop of thermostatic metal a greater spreading action of the arms under the action of heat is obtained.

It will be noted that the grenade is supported in tilted position and in case of fire the arms 31 and 32 will swing away from and release the grenade which will then fall and break, freeing the fire extinguishing fluid.

In Figs. 7 and 8 the grenade is supported on the shelf 26, as in the form of the invention shown in Figs. 4, 5 and 6, but in this embodiment the grenade is held on the shelf by an arm 40 having a dished grenade engaging member 41 on the outer end thereof. The arm 40 is formed of thermostatic metal and has integrally formed therewith a loop 43, the other end of the arm being secured as shown at 44 to the back plate or bracket 25.

In case of fire the arm 40 will swing upwardly away from the grenade, thus releasing the grenade from the engaging and retaining member 41 carried by the arm. The grenade will then drop and break as above described.

From the foregoing description it will be clear that simple, practical and inexpensive grenade holding and retaining means has been designed and that in each form of the invention a new grenade can be easily and quickly placed in the holder or support after the thermostatic retaining means has resumed its normal grenade retaining position. It will also be clear that the only replacement required to place the apparatus in operable condition after a fire is the grenade itself and no replacement of fusible links or other heat responsive device is necessary.

By the term "grenade" as used in the specification and claims is meant a frangible container having a fire extinguishing fluid therein.

Although certain specific embodiments of the invention utilizing thermostatic metal have been particularly illustrated and described, it will be obvious that further changes and modifications in the construction and in the arrangement of the thermostatic grenade holding and retaining elements may be made without departing from the spirit or scope of the invention, as expressed in the following claims.

What I claim is:

1. A grenade support comprising supporting means and grenade engaging and supporting means carried by said means and including a strip formed of thermostatic metal arranged to release the grenade under the action of heat thereon.

2. A grenade support comprising a supporting element, and means carried by said element, including a thermostatic strip adapted to normally embrace and hold a grenade and to release the grenade under the action of heat.

3. A grenade support comprising a bracket, means on the bracket for supporting a grenade from below, and means including a thermostatic strip for holding the grenade on said supporting means, said grenade being biased to fall by gravity when released from said supporting means.

4. A grenade support comprising a bracket, means on the bracket for supporting a grenade from below, and grenade embracing and holding means including a thermostatic strip for holding the grenade on said supporting means, said grenade being biased to fall by gravity when released from said supporting means.

5. A grenade support comprising a supporting element, means on the supporting element for supporting a grenade from below, and grenade embracing and holding means including a thermostatic strip for holding the grenade on said supporting means, said grenade being biased to fall by gravity when released from said supporting means.

6. A grenade support comprising a supporting element, and a plurality of resilient arms carried thereby and adapted to embrace and support a grenade, at least one of said arms being formed of thermostatic metal constructed and arranged to release the grenade upon a rise in temperature of said thermostatic metal.

7. A grenade support comprising a bracket, a shelf on the bracket for supporting a grenade from below, said grenade being biased to fall from the shelf, and means including a thermostatic strip for holding the grenade on said supporting shelf, said thermostatic strip being adapted to release the grenade under the action of heat.

8. A grenade support comprising supporting means, and resilient means carried by said means, including a thermostatic strip and adapted to embrace and hold a grenade and to release the grenade under the action of heat.

9. A grenade support comprising a supporting element, and a plurality of grenade embracing and holding arms carried thereby, said arms being formed of resilient thermostatic metal constructed and arranged to release the grenade upon a rise in temperature of said thermostatic metal.

10. A grenade support comprising a bracket, means on the bracket for supporting a grenade from below, and means including a strip of thermostatic metal carried by said bracket and having a portion adapted to engage the grenade and hold the grenade on the supporting means, said strip having a loop intermediate its ends engaging the bracket, said holding means being adapted to release the grenade under the action of heat.

11. A grenade support comprising a supporting element, and means carried thereby for releasably supporting a grenade, said means including a strip of thermostatic metal arranged to release the grenade in case of fire.

12. A grenade support comprising a supporting member, and means carried by said member and including a strip of thermostatic metal for supporting a frangible grenade, the grenade being supported from below and biased to fall under the action of heat on said thermostatic element.

13. A grenade support comprising supporting means, and grenade engaging and supporting means carried by said means and including a strip formed of thermostatic metal arranged to swing relative to the grenade and to release the grenade under the action of heat thereon.

14. A grenade support comprising a bracket, means on the bracket for engaging a grenade from below, and means including a strip of thermostatic metal coacting with the first named means to releasably support the grenade, said strip of thermostatic metal being arranged to release the grenade under the action of heat on said strip.

In witness whereof, I have hereunto set my hand this 21st day of July, 1931.

WILHELM B. BRONANDER.